(12) United States Patent
Sowder

(10) Patent No.: US 9,507,364 B2
(45) Date of Patent: Nov. 29, 2016

(54) METHODS FOR REDUCING SOLAR INVERTER OUTPUT VOLATILITY, AND RELATED NODES AND SOLAR INVERTERS

(71) Applicant: Duke Energy Corporation, Charlotte, NC (US)

(72) Inventor: Daniel B. Sowder, Charlotte, NC (US)

(73) Assignee: Duke Energy Corporation, Charlotte, NC (US)

( * ) Notice: Subject to any disclaimer, the term of this patent is extended or adjusted under 35 U.S.C. 154(b) by 256 days.

(21) Appl. No.: 14/202,854

(22) Filed: Mar. 10, 2014

(65) Prior Publication Data

US 2015/0253797 A1   Sep. 10, 2015

(51) Int. Cl.
*G05F 1/67* (2006.01)
*H02J 3/38* (2006.01)
*H02S 40/32* (2014.01)

(52) U.S. Cl.
CPC ............... *G05F 1/67* (2013.01); *H02J 3/383* (2013.01); *H02S 40/32* (2014.12)

(58) Field of Classification Search
CPC ....... Y10T 307/826; G05F 1/67; H02J 3/383
USPC ........................................................ 307/125
See application file for complete search history.

(56) References Cited

U.S. PATENT DOCUMENTS

| | | | |
|---|---|---|---|
| 7,552,100 | B2 | 6/2009 | Chen |
| 7,989,983 | B2 | 8/2011 | Folts et al. |
| 8,019,697 | B2 | 9/2011 | Ozog |
| 8,264,193 | B2 | 9/2012 | Kular et al. |
| 8,364,609 | B2 | 1/2013 | Ozog |
| 8,492,926 | B2 | 7/2013 | Collins et al. |
| 2010/0057267 | A1 | 3/2010 | Liu et al. |
| 2010/0114397 | A1 | 5/2010 | Cardinal et al. |
| 2010/0204844 | A1* | 8/2010 | Rettger ............... H02J 3/06 700/291 |
| 2010/0283325 | A1 | 11/2010 | Marcianesi et al. |
| 2011/0006742 | A1 | 1/2011 | Teggatz et al. |
| 2011/0084551 | A1 | 4/2011 | Johnson et al. |
| 2013/0106371 | A1 | 5/2013 | Shimura |
| 2013/0131884 | A1 | 5/2013 | Jain et al. |

FOREIGN PATENT DOCUMENTS

AU   WO 2010057250 A1 *  5/2010  ............. H02J 3/383

OTHER PUBLICATIONS

Ellis et al., "PV Output Smoothing with Energy Storage," Sandia Report, Mar. 2012, Sandia National Laboratories, Albuquerque, New Mexico and Livermore, California (27 pages).
Hund et al., "Grid-Tied PV System Energy Smoothing," Sandia National Laboratories, Albuquerque, New Mexico (5 pages).
"Solar Variability Model for PV Plant Design and Power Buffering," UC San Diego Technology Transfer Office, © 2013, Retrieved Date: Mar. 7, 2014, From URL: http://techtransfer.universityofcalifornia.edu/NCD/23027.html (2 pages).

* cited by examiner

*Primary Examiner* — Fritz M Fleming
(74) *Attorney, Agent, or Firm* — Myers Bigel, P.A.

(57) ABSTRACT

Methods for reducing solar inverter output volatility are provided. A method for reducing solar inverter output volatility may include determining whether an output fluctuation by a solar inverter is likely, using output data of the solar inverter. Moreover, the method may include curtailing an output of the solar inverter in response to determining that the output fluctuation by the solar inverter is likely. Related solar inverters and solar installation nodes are also described.

18 Claims, 14 Drawing Sheets

METHODS FOR REDUCING SOLAR INVERTER OUTPUT VOLATILITY, AND RELATED NODES AND SOLAR INVERTERS

FIELD

The present disclosure relates to solar inverters.

BACKGROUND

An injection of solar power generation onto a distribution circuit connected to many customers can cause several disruptions in characteristics of the distribution circuit. For example, a rapid and unexpected increase or decrease in solar power output, often caused by changes in cloud cover, can disrupt normal operations of a distribution circuit and result in out-of-specification conditions such as a voltage that deviates from a standard.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present inventive concepts.

Various embodiments of the present inventive concepts include a method for reducing solar inverter output volatility. The method may include determining whether an output fluctuation by a solar inverter is likely, using output data of the solar inverter. Moreover, the method may include curtailing an output of the solar inverter in response to determining that the output fluctuation by the solar inverter is likely. In some embodiments, determining whether the output fluctuation is likely may include determining a likelihood of the output fluctuation by the solar inverter, using the output data of the solar inverter, and comparing the likelihood of the output fluctuation by the solar inverter with a threshold. In some embodiments, the output data of the solar inverter may include real-time and/or past output data of the solar inverter, and determining whether the output fluctuation by the solar inverter is likely may include determining whether the output fluctuation by the solar inverter is likely, using the real-time and/or past output data of the solar inverter.

According to various embodiments, the output fluctuation may include a future output fluctuation, and determining whether the output fluctuation by the solar inverter is likely may include determining whether the future output fluctuation by the solar inverter is likely, using the real-time and/or past output data of the solar inverter. Moreover, determining whether the output fluctuation by the solar inverter is likely may include determining whether the output fluctuation by the solar inverter is likely, using the real-time and/or past output data of the solar inverter, independently of any measurement or detection by a cloud-cover sensor or another inverter.

In various embodiments, the method may include measuring the real-time and/or past output data of the solar inverter by measuring power that is output by the solar inverter, and determining whether the output fluctuation by the solar inverter is likely may include determining whether the output fluctuation by the solar inverter is likely, using only the real-time and/or past output data of the solar inverter. In some embodiments, the real-time and/or past output data of the solar inverter may include at least one discrete value of real-time and/or past output of the solar inverter, and determining whether the output fluctuation by the solar inverter is likely may include determining whether the output fluctuation by the solar inverter is likely, using only the at least one discrete value of real-time and/or past output of the solar inverter.

According to various embodiments, determining whether the output fluctuation is likely may include determining a volatility difference for the solar inverter. The volatility difference may include a ratio between: an end-to-end straight linear distance corresponding to a graphical representation of power output by the solar inverter over a time period; and a summation of a plurality of linear distances corresponding to the graphical representation of power output by the solar inverter over a plurality of respective sub-time-periods of the time period. Moreover, operations of determining whether the output fluctuation by the solar inverter is likely and curtailing the output of the solar inverter may be self-contained within the solar inverter.

In various embodiments, determining whether an output fluctuation by the solar inverter is likely may include generating, at a node of a solar installation that includes the solar inverter, the output data of the solar inverter by measuring power that is output by the solar inverter; determining, at the node, whether the output fluctuation by the solar inverter is likely, using the output data of the solar inverter. Moreover, curtailing the output of the solar inverter may include transmitting a curtailment command to limit the output of the solar inverter, from the node to the solar inverter, in response to determining that the output fluctuation by the solar inverter is likely.

According to various embodiments, the method may include gradually reducing an amount of curtailment of the output of the solar inverter. Additionally or alternatively, determining whether the output fluctuation is likely may include determining whether the output fluctuation by the solar inverter is likely, independently of Maximum Power Point Tracking for the solar inverter.

A node of a solar installation, according to various embodiments, may include a processor configured to generate output data by measuring power that is output by a solar inverter of the solar installation. The processor may be configured to determine whether an output fluctuation by the solar inverter is likely, using the output data from the solar inverter. Moreover, the processor may be configured to transmit, to the solar inverter, a curtailment command to limit the output of the solar inverter, in response to determining that the output fluctuation by the solar inverter is likely. In some embodiments, the processor may be configured to determine whether the output fluctuation by the solar inverter is likely by: determining a likelihood of the output fluctuation by the solar inverter, using the output data from the solar inverter; and comparing the likelihood of the output fluctuation by the solar inverter with a threshold. In some embodiments, the output data of the solar inverter may include real-time and/or past output data of the solar inverter, and the processor may be configured to determine whether the output fluctuation by the solar inverter is likely, using the real-time and/or past output data of the solar inverter.

According to various embodiments, the output fluctuation may include a future output fluctuation, and the processor may be configured to determine whether the output fluctuation by the solar inverter is likely by: determining whether the future output fluctuation by the solar inverter is likely, using the real-time and/or past output data of the solar inverter. In some embodiments, the processor may be configured to determine whether the output fluctuation is likely by determining a volatility difference for the solar inverter. The volatility difference may include a ratio between: an end-to-end straight linear distance corresponding to a graphical representation of solar output by the solar inverter over a time period; and a summation of a plurality of linear distances corresponding to the graphical representation of solar output by the solar inverter over a plurality of respective sub-time-periods of the time period.

A solar inverter, according to various embodiments, may include circuitry configured to provide a power output. Moreover, the solar inverter may include a processor configured to receive, from a node of a solar installation that includes the solar inverter, a curtailment command to preemptively limit the power output of the solar inverter in advance of a likely fluctuation of the power output. The processor may be configured to preemptively limit the power output of the solar inverter in advance of the likely fluctuation of the power output, in response to the curtailment command from the node of the solar installation. In some embodiments, the processor may be configured to receive the curtailment command directly from the node via a message bus that is within the solar installation.

A solar inverter, according to various embodiments, may include circuitry configured to provide a power output. Moreover, the solar inverter may include a processor configured to determine whether a fluctuation of the power output is likely, using real-time and/or past output data for the solar inverter. The processor may be configured to preemptively limit the power output of the solar inverter in advance of the fluctuation of the power output, in response to determining that the fluctuation of the power output is likely. In some embodiments, the processor may be configured to determine whether the fluctuation is likely by determining a volatility difference for the solar inverter. The volatility difference may include a ratio between: an end-to-end straight linear distance corresponding to a graphical representation of solar output by the solar inverter over a time period; and a summation of a plurality of linear distances corresponding to the graphical representation of solar output by the solar inverter over a plurality of respective sub-time-periods of the time period.

It is noted that aspects of the present inventive concepts described with respect to one embodiment may be incorporated in a different embodiment although not specifically described relative thereto. That is, all embodiments and/or features of any embodiment can be combined in any way and/or combination. Applicants reserve the right to change any originally filed claim or file any new claim accordingly, including the right to be able to amend any originally filed claim to depend from and/or incorporate any feature of any other claim although not originally claimed in that manner. These and other objects and/or aspects of the present inventive concepts are explained in detail below.

BRIEF DESCRIPTION OF THE DRAWINGS

The accompanying drawings, which form a part of the specification, illustrate various embodiments of the present inventive concepts. The drawings and description together serve to fully explain embodiments of the present inventive concepts.

DETAILED DESCRIPTION

Figure 1A:
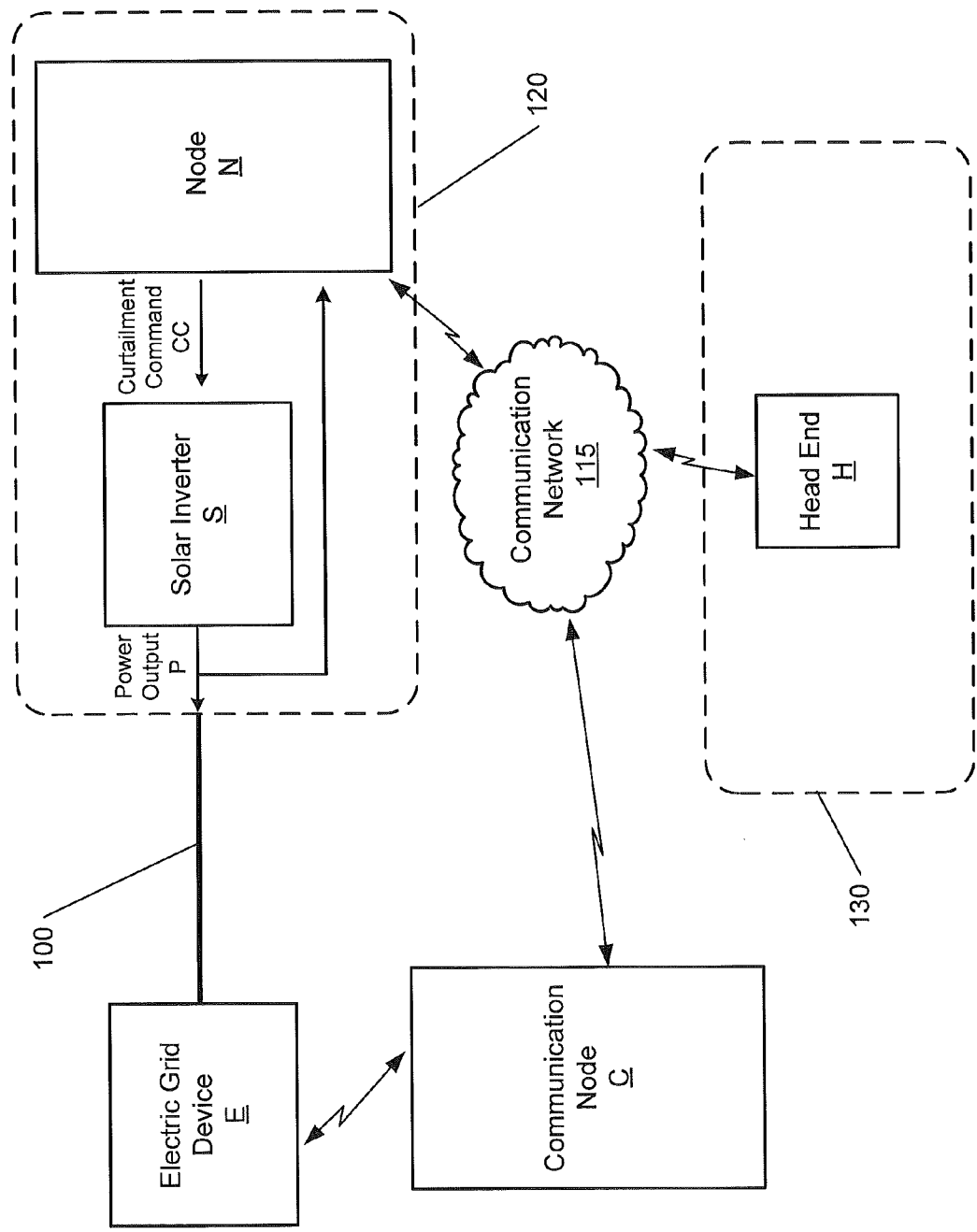
FIG. 1A is a schematic illustration of a solar inverter that provides output power to a distribution network, according to various embodiments.

Specific example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes, devices, and methods. Accordingly, example embodiments of the present inventive concepts may be embodied in hardware and/or in software (including firmware, resident software, micro-code, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

If a solar inverter's power output is volatile, then this volatility can disrupt operations by a distribution circuit coupled to the solar inverter. Moreover, using sensors to detect and react to such solar inverter volatility can be expensive and complex. Various embodiments described herein, however, may reduce solar inverter output volatility by directly measuring real-time and/or past power output by a solar inverter and then preemptively curtailing the solar inverter's output based on the probability of future/subsequent rapid output fluctuations. As an example, various embodiments described herein may look at the real-time and/or past solar output itself to predict cloud cover, instead of detecting cloud cover using a sensor such as a camera. In other words, the probability of a future impact may be calculated based on real-time and/or past performance, and a solar inverter may preemptively curtail its output, based on this probability, to reduce output volatility. Accordingly, various embodiments described herein may provide a less-volatile power output for a solar inverter/generator, thus enabling the solar inverter/generator to be a more valuable contributor to a grid of interconnected generation resources.

Referring now to FIG. 1A, a schematic illustration is provided of a solar inverter S that provides output power (or "power output") P to a distribution network/circuit connected to many customers. For example, the solar inverter S may provide the output power P to an electric grid 100 that may include any number of electric grid devices E. Additionally or alternatively, the solar inverter S may provide the output power P to a local, off-grid electrical network.

One or more communication nodes C may communicate with the electric grid devices E using wireless communications (e.g., 3G/LTE, other cellular, WiFi, etc.) or wired communications (e.g., Power Line Carrier (PLC), Ethernet, serial, Universal Serial Bus (USB), etc.). An electric grid device E may be, for example, an electric utility meter, a transformer, a light (e.g., a street light), an electric grid control device, an electric grid protection device, a recloser, a line sensor, a weather sensor, an Advanced Metering Infrastructure (AMI) device, an analog or digital sensor connected to an electric utility asset, an electric generator, an electric turbine, an electric boiler, an electric vehicle, a home appliance, a battery storage device, a capacitor device, a solar power device, a smart generation device, an intelligent switching device, an emission monitoring device, or a voltage regulator.

Moreover, one or more of the communication nodes C may communicate with a head end system H of an electric utility data center 130 via a communication network 115. The communication network 115 may include one or more wireless or wired communication networks, such as a local area network (e.g., Ethernet or WiFi) or a Wide Area Network (e.g., a cellular network, Ethernet, or a fiber (such as fiber-optic) network).

Referring still to FIG. 1A, a solar installation 120 that includes the solar inverter S may also include a node N that may provide communications with the solar inverter S and/or the communication network 115. The node N may measure the output power P of the solar inverter S and may responsively transmit a curtailment command CC to curtail the output power P. The term "curtail" may be used herein to describe reducing or limiting the output power P of the solar inverter S to reduce, limit, or avoid volatility of the output power P. Moreover, in some embodiments, the node N of the solar installation 120 may be a communication node C.

Figure 1B:
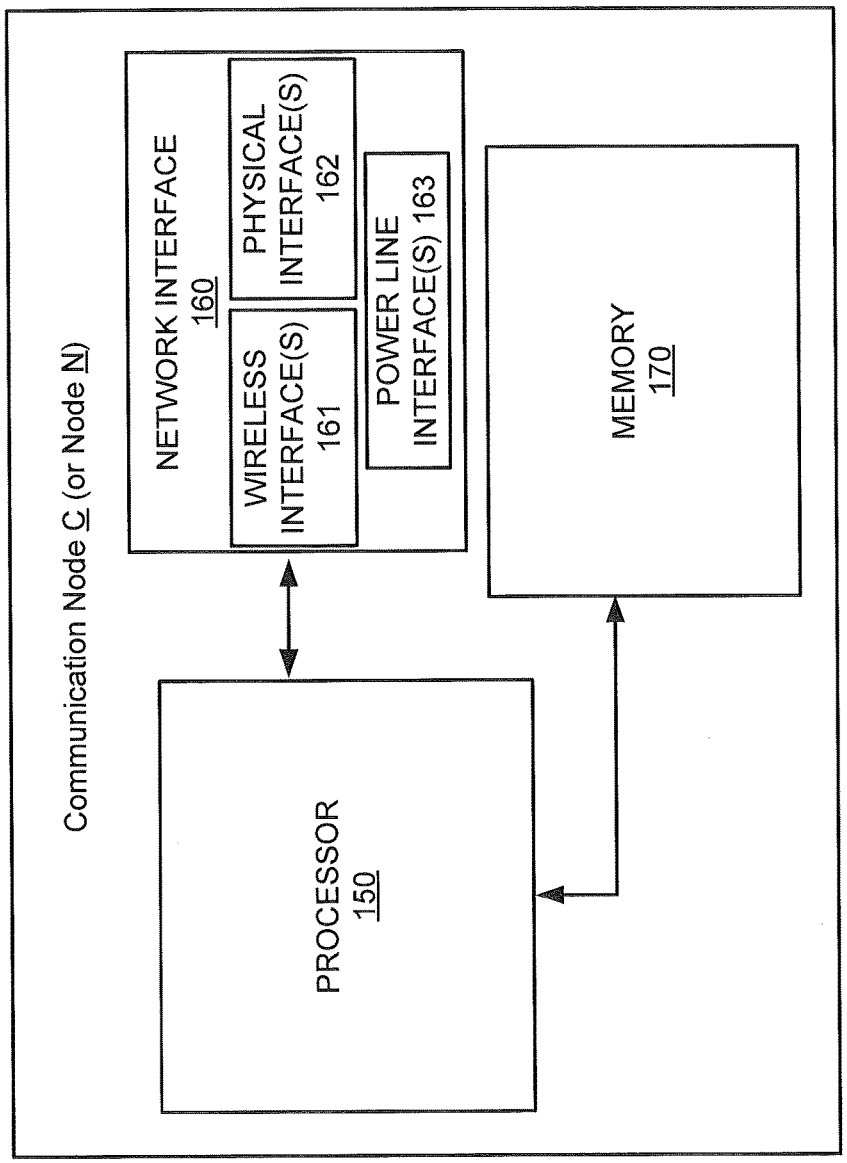
FIG. 1B is a block diagram of a communication node of FIG. 1A, according to various embodiments.

Referring now to FIG. 1B, a block diagram is provided of a communication node C of FIG. 1A, according to various embodiments. The communication node C may include a processor 150, a network interface 160, and a memory 170. The processor 150 of the communication node C may be coupled to the network interface 160. The processor 150 may be configured to communicate with electric grid devices E, other communication nodes C, the solar inverter S, the node N, and/or the electric utility data center 130 via the network interface 160.

For example, the network interface 160 may include one or more wireless interfaces 161 (e.g., 3G/LTE, other cellular, WiFi, Global Positioning System (GPS) interfaces, etc.) and one or more physical interfaces 162 (e.g., Ethernet, serial, Universal Serial Bus (USB) interfaces, etc.). Moreover, the network interface 160 may optionally include one or more power line interfaces 163 (e.g., Low Voltage (LV) or Mid Voltage (MV) PLC).

Referring still to FIG. 1B, the memory 170 may be coupled to the processor 150. The memory 170 may also store instructions/algorithms used by the processor 150. The communication node C may include core hardware components such as a power supply, 400 MHz or higher speed processor(s), and 256 Megabytes (MB) or more of RAM.

The communication node C may include core applications, such as CPU/memory/OS management applications, port/device drivers, router/Internet Protocol (IP) services, network management services, basic protocol support, SCADA, custom Application Programming Interface (API)/ applications, and device security services. Moreover, the communication node C may include virtual applications, such as a virtual machine (e.g., a Java Virtual Machine), message bus(es), message broker(s), protocol adapters, mini-SCADA, open-standards API, and third-party applications (e.g., security/analytics applications). The core applications may use such software as C++/Linux, and the virtual applications may use such software as Java/Linux.

Figure 1C:
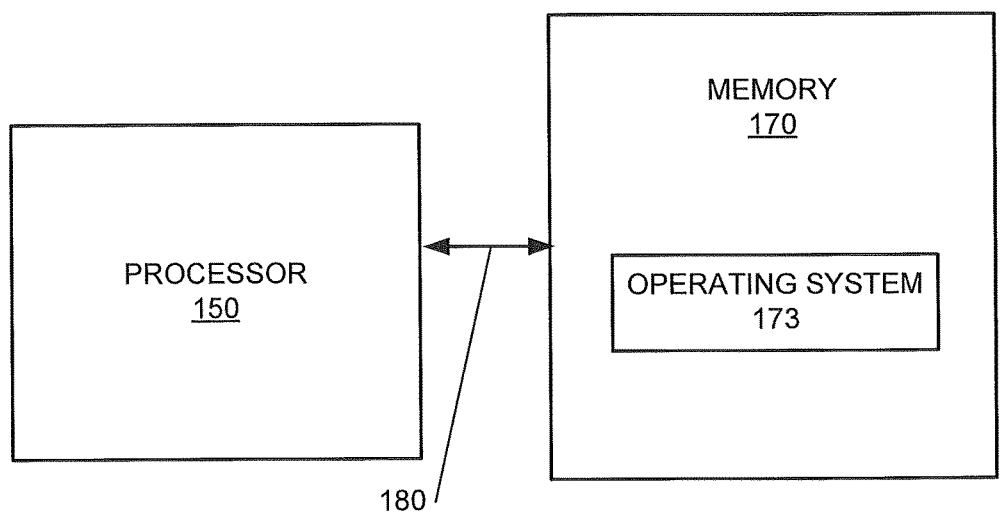
FIG. 1C is a block diagram that illustrates details of an example processor and memory that may be used in accordance with various embodiments.

Referring now to FIG. 1C, a block diagram is provided that illustrates details of an example processor 150 and memory 170 of a communication node C that may be used in accordance with various embodiments. The processor 150 communicates with the memory 170 via an address/data bus 180. The processor 150 may be, for example, a commercially available or custom microprocessor. Moreover, the processor 150 may include multiple processors. The memory 170 is representative of the overall hierarchy of memory devices containing the software and data used to implement various functions of a communication node C (or a node N) as described herein. The memory 170 may include, but is not limited to, the following types of devices: cache, ROM, PROM, EPROM, EEPROM, flash, Static RAM (SRAM), and Dynamic RAM (DRAM).

As shown in FIG. 1C, the memory 170 may hold various categories of software and data, such as an operating system 173. The operating system 173 controls operations of a communication node C. In particular, the operating system 173 may manage the resources of the communication node C and may coordinate execution of various programs by the processor 150.

Figure 1D:
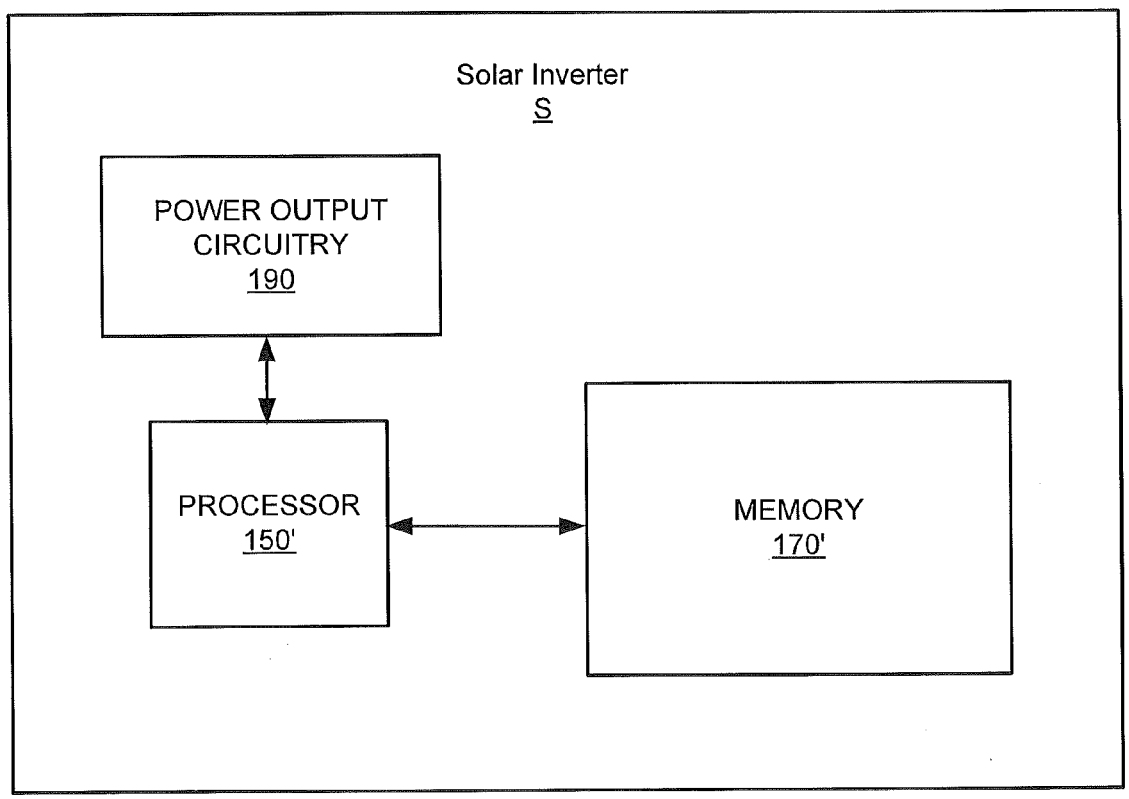
FIG. 1D is a block diagram of a solar inverter of FIG. 1A, according to various embodiments.

Referring now to FIG. 1D, a block diagram is provided of a solar inverter S of FIG. 1A, according to various embodiments. The solar inverter S may include power output circuitry 190 and may optionally include a processor 150' and/or a memory 170'. The power output circuitry 190 may include, for example, various types of circuitry configured to convert a direct current (DC) output of a photovoltaic (PV) solar panel into a utility frequency alternating current (AC) that can be fed into a commercial electrical grid (e.g., the grid 100) or used by a local, off-grid electrical network. For example, the power output circuitry 190 may be configured to provide the power Output P illustrated in FIG. 1A.

Figure 2A:
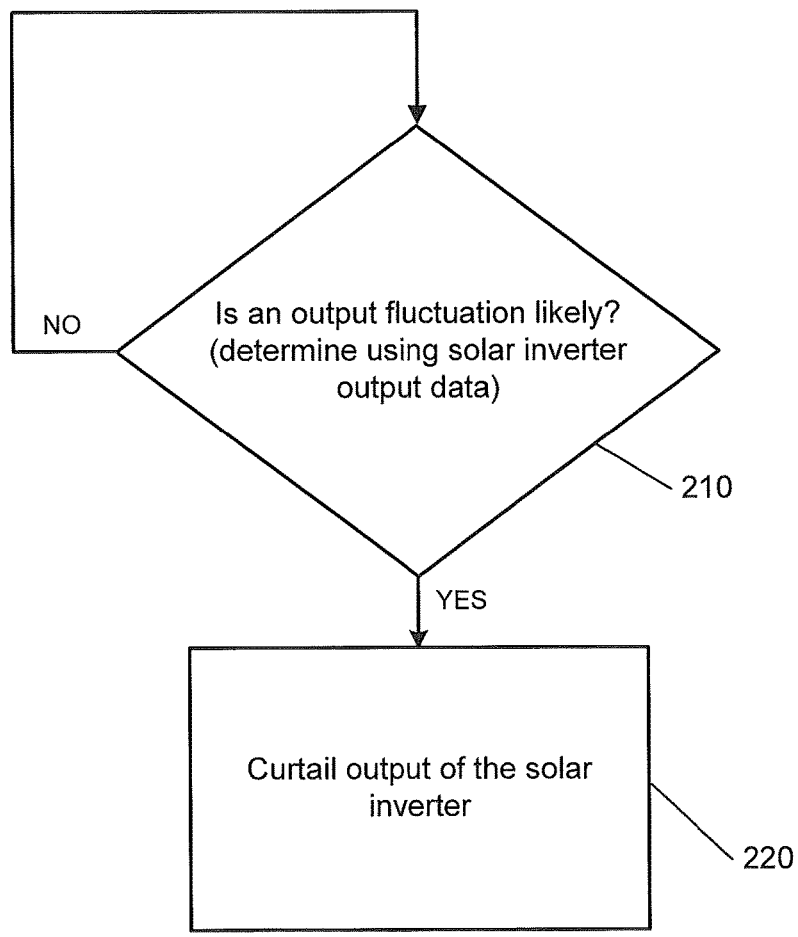
FIGS. 2A-2D are flowcharts illustrating operations for reducing solar inverter output volatility, according to various embodiments.

Referring now to FIGS. 2A-2D, flowcharts are provided illustrating operations for reducing solar inverter output volatility, according to various embodiments. Referring to FIG. 2A, operations for reducing solar inverter output volatility may include determining (Block 210) whether an output fluctuation by a solar inverter S is likely, using output data of the solar inverter S. For example, the operations of Block 210 may include calculating the probability of future output intermittency using information that is local to the solar inverter S (e.g., using actual real-time and/or past performance data for the solar inverter S measured in kilowatts or another discrete value). Moreover, the operations may include curtailing (Block 220) an output P of the solar inverter S in response to determining that the output fluctuation by the solar inverter S is likely. For example, the operations of Block 220 may preemptively curtail the power output P of the solar inverter S based on the probability/ likelihood of future rapid output fluctuations.

Figure 2B:
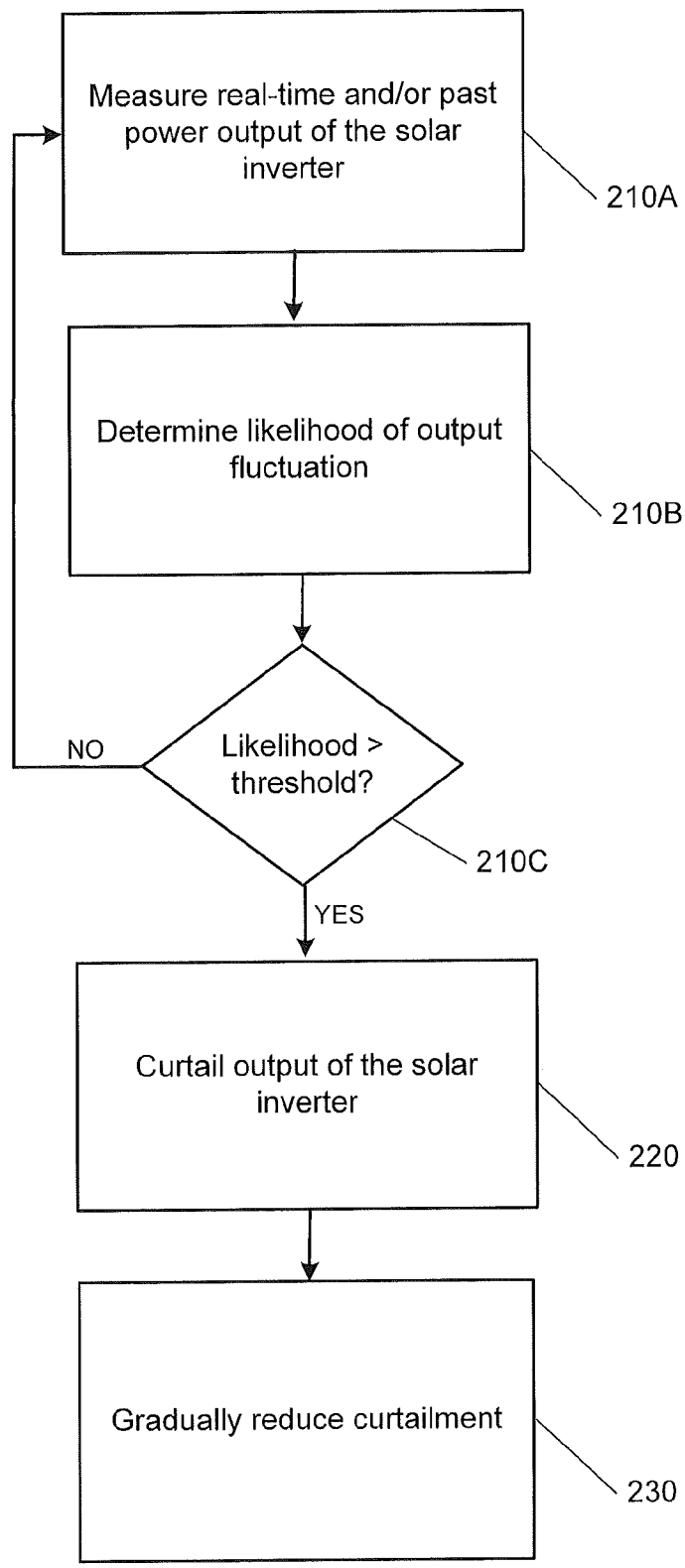

Referring to FIG. 2B, operations of determining (Block 210) whether the output fluctuation by the solar inverter S is likely may include measuring (Block 210A) real-time and/or past power P that is output by the solar inverter S. The operations of determining (Block 210) whether the output fluctuation by the solar inverter S is likely may include determining (Block 210B) a likelihood of the output fluctuation by the solar inverter S, using data corresponding to the real-time and/or past power output P of the solar inverter S. Moreover, the operations of determining (Block 210) whether the output fluctuation by the solar inverter S is likely may include comparing (Block 210C) the likelihood of the output fluctuation by the solar inverter S with a threshold.

Referring still to FIG. 2B, operations for reducing solar inverter output volatility may optionally include gradually relaxing/reducing (Block 230) the curtailment (Block 220) of the output power P of the solar inverter S.

Figure 2C:
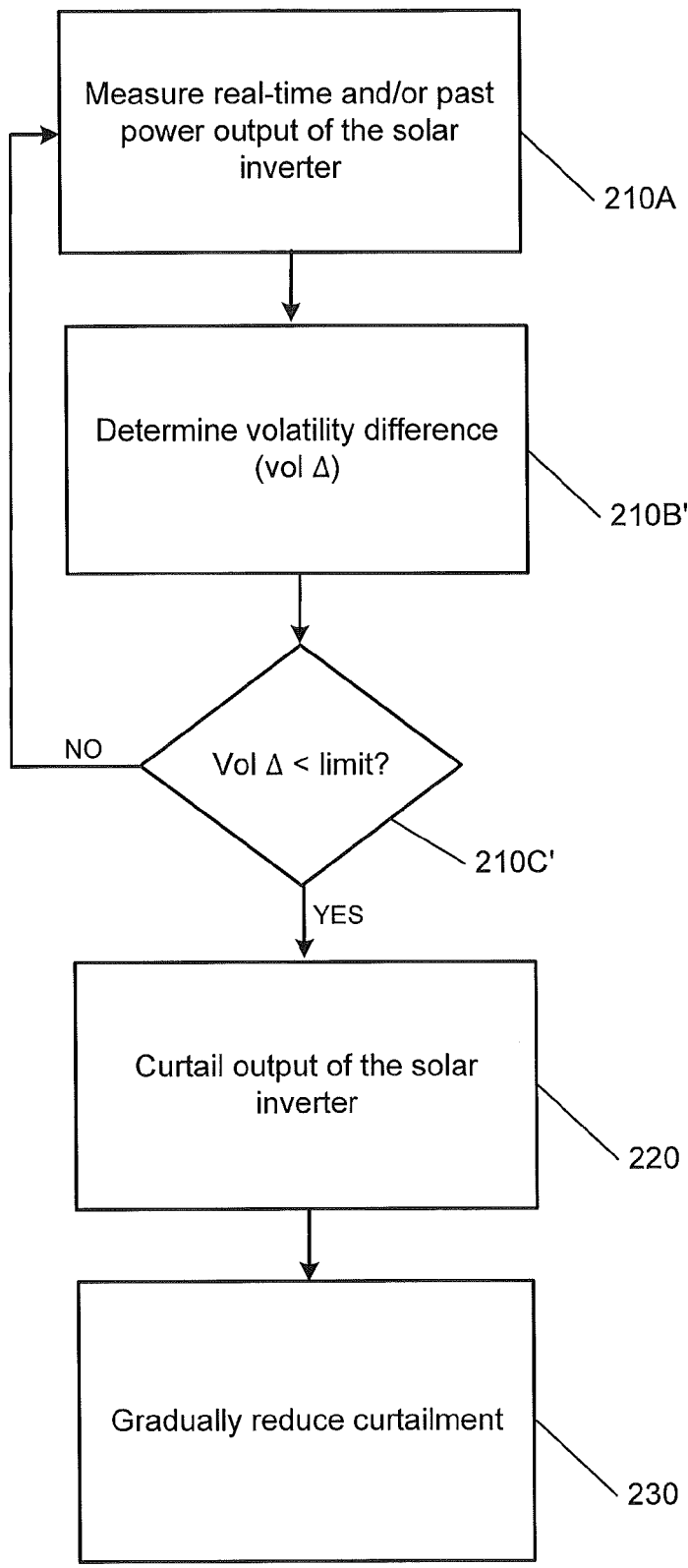

Referring to FIG. 2C, operations of determining (Block 210B) the likelihood of the output fluctuation by the solar inverter S may include determining (Block 210B') a volatility difference for the solar inverter S. Moreover, operations of comparing (Block 210C) the likelihood of the output fluctuation by the solar inverter S with a threshold may include comparing (Block 210C') the volatility difference with a limit/threshold.

Figure 2D:
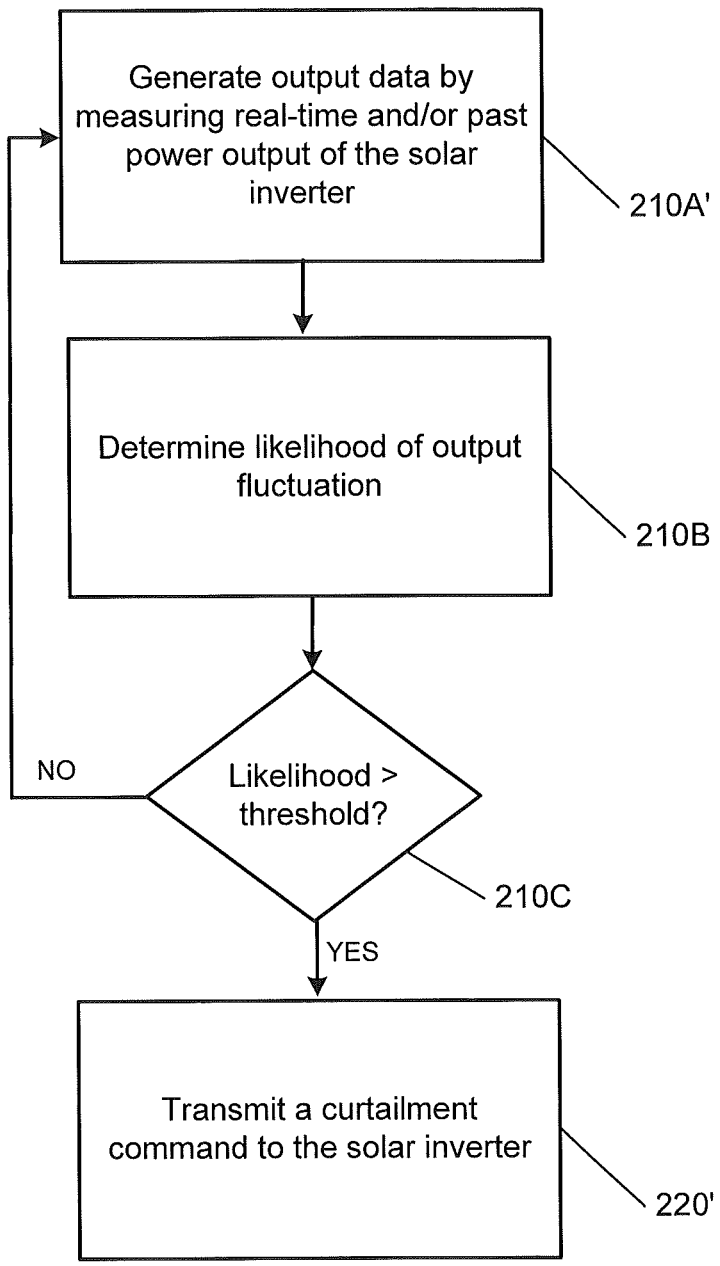

Referring to FIG. 2D, the operations of FIGS. 2A-2C may be performed by the node N (e.g., using the processor 150) of the solar installation 120. For example, operations of measuring (Block 210A) real-time and/or past power output P of the solar inverter S may include generating (Block 210A'), at the node N, output data for the solar inverter S by measuring the real-time and/or past power P that is output by the solar inverter S. Moreover, the operations of curtailing (Blocks 220/230) the output P of the solar inverter S may include transmitting (Block 220') a curtailment command CC to limit the output P of the solar inverter S, from the node N to the solar inverter S, in response to determining (Blocks 210B, 210C) that the output fluctuation by the solar inverter S is likely. The inventive entity appreciates, however, that operations of determining (Block 210) whether the output fluctuation by the solar inverter S is likely and curtailing (Blocks 220/230) the power output P of the solar inverter S may be self-contained within the solar inverter S (e.g., may be performed using the processor 150') in some embodiments.

In embodiments where volatility curtailment operations are self-contained within the solar inverter S, the solar inverter S may preemptively self-limit/reduce its own power output P in advance of a likely fluctuation of the power output P, in response to determining that the fluctuation of the power output P is likely. In embodiments where volatility curtailment operations are controlled/managed by the node N of the solar installation 120 that includes the solar inverter S, the solar inverter S may be configured to receive, from the node N, a curtailment command CC to preemptively limit/reduce the power output P of the solar inverter S in advance of a likely fluctuation of the power output P. The solar inverter S may then preemptively limit/reduce the power output P of the solar inverter S in advance of the likely fluctuation of the power output P, in response to the curtailment command CC from the node N of the solar installation 120. In some embodiments, the solar inverter S may receive the curtailment command CC directly from the node N via a message bus that is within the solar installation 120.

The operations illustrated in FIGS. 2A-2D can reduce system cost and complexity because these operations may be independent of cloud-cover detection or other forms of using external sensors/other solar inverters for detection/measurement of solar output volatility. Because such sensors are optional, the difficulty of predicting the impact of events detected by the sensors may also be avoided/reduced. Additionally or alternatively, the operations illustrated in FIGS. 2A-2D can be performed independently of Maximum Power Point Tracking (MPPT) operations, but could be performed concurrently with MPPT operations in some embodiments. Accordingly, in some embodiments, operations of determining (Block 210) whether an output fluctuation by a solar inverter S is likely may be performed (by either the solar inverter S or the node N) within a solar installation 120 that includes the solar inverter S, using only real-time and/or past output data of (e.g., using at least one discrete value thereof) that specific solar inverter S.

Moreover, in some embodiments, a particular solar inverter S may self-curtail as described herein, and may also send a curtailment command CC, which is based on the particular solar inverter S's power output P, to adjacent solar inverters S. For example, operations of Block 220' of FIG. 2D may include sending the curtailment command CC to adjacent solar inverters S, as well as using the curtailment command CC with the particular solar inverter S. The adjacent solar inverters S may then curtail based on this curtailment command CC, without running an algorithm to independently provide a curtailment command CC themselves. Accordingly, the power output P of a single solar array may act as a proxy for the power output P of multiple adjacent solar arrays. The curtailment command CC provided by an algorithm for the particular solar inverter S may therefore be provided to multiple adjacent solar inverters S.

The operations illustrated in FIGS. 2A-2D can be used to make decisions based on a measurement of power output P at a specific generator (e.g., a specific solar inverter S). For example, the operations can provide self-curtailing at a specific solar inverter S rather than using an external (e.g., external to the solar installation 120) device that reacts to the solar inverter S. In some embodiments, the operations can be performed for a single solar inverter S. In some embodiments, an algorithm that controls/executes the operations could be installed on a plurality of solar inverters S, and the plurality of solar inverts S could run the algorithm independently of each other.

Figure 3:
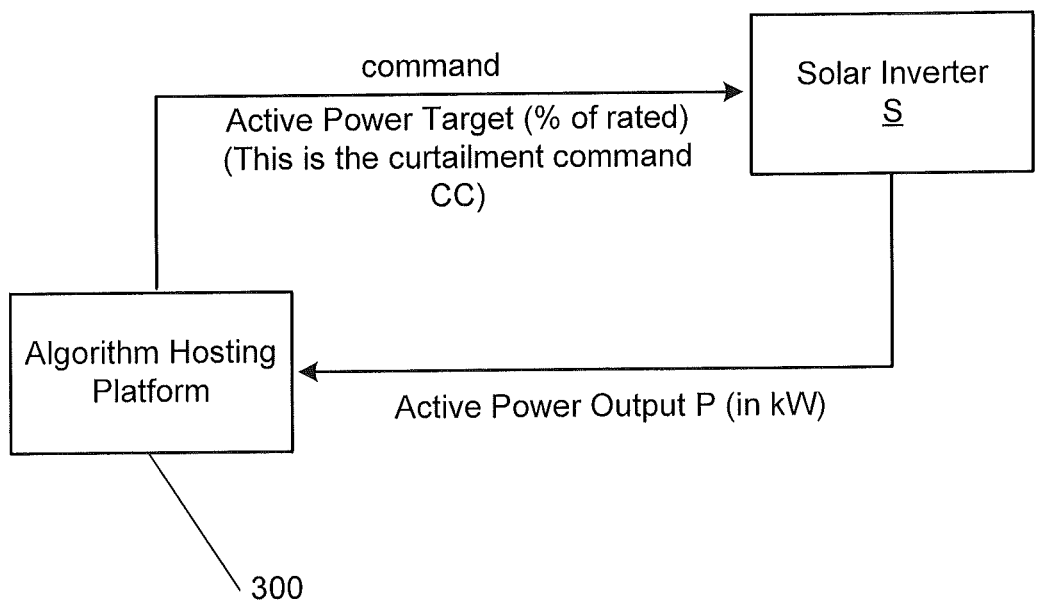
FIG. 3 is a schematic illustration of a solar inverter that receives a command to curtail its power output, according to various embodiments.

Referring now to FIG. 3, a schematic illustration is provided of a solar inverter S that receives a command CC to curtail its power output P, according to various embodiments. For example, FIG. 3 illustrates that the solar inverter S provides (e.g., via a message bus) an active power output P (with a discrete kilowatt (kW) value) to a platform 300 that executes operations described herein for reducing solar inverter output volatility. As an example, the platform 300 may host an algorithm that provides the operations illustrated in FIG. 2D. In particular, the platform 300 may receive the active power output P as an input and may responsively generate and transmit the curtailment command CC to the solar inverter S, using the algorithm. The platform 300 is located at the solar installation 120. In some embodiments, the platform 300 may be included in the node N that is illustrated in FIG. 1A.

Figure 4:
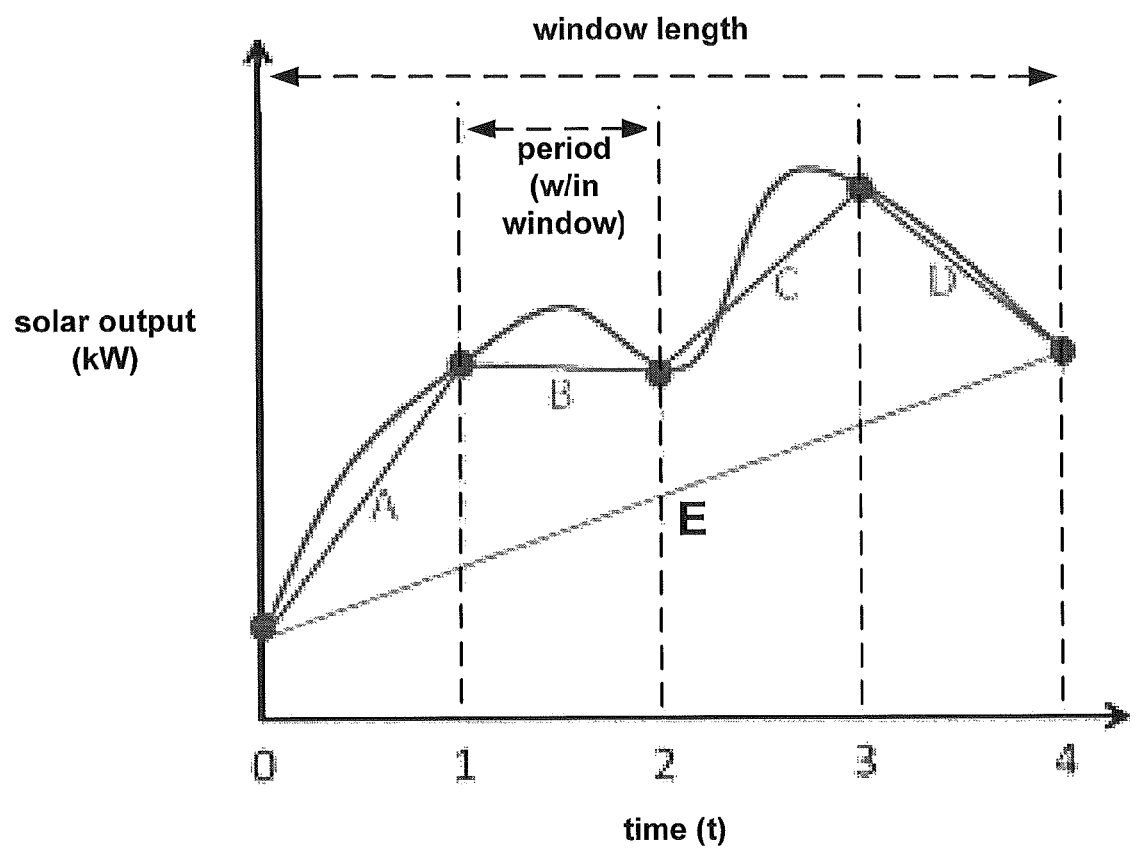
FIG. 4 is a graph that illustrates a volatility difference of a solar inverter, according to various embodiments.

Referring now to FIG. 4, a graph is provided that illustrates a volatility difference of a solar inverter S, according to various embodiments. Referring again to Block 210B' of FIG. 2C, determining a volatility difference of a solar inverter S is one way to calculate a probability that a future output power fluctuation by the solar inverter S is likely. In other words, various embodiments described herein can be used to determine that a power swing is more likely to occur because certain conditions are met, and determining that a power swing is more likely because of a given volatility difference is one example of such embodiments.

The volatility difference (volatility Δ) is a ratio between (a) an end-to-end trailing linear distance (e.g., Length E) of the solar power output P over a specified time period called a window and (b) a summation of the linear distances (e.g., Lengths A-D) of a set of smaller periods within the window, as indicated by the following Equation 1':

$$\text{Volatility } \Delta = \frac{\text{end to end linear distance over window}}{\sum_{\varsigma=0}^{window} \text{period mileages}} \qquad \text{(Equation 1)}$$

Moreover, FIG. 4 graphically illustrates an example of the volatility difference calculation, using the above Equation 1 and lengths A-E as follows to provide Equation 1:

$$\text{Volatility}\Delta = \frac{\text{Length } E}{\text{Lengths } A + B + C + D} \qquad \text{(Equation 1')}$$

Accordingly, the volatility difference may be described as a ratio between (i) an end-to-end straight linear distance corresponding to a graphical representation of solar output P by the solar inverter S over a time period and (ii) a summation of a plurality of linear distances corresponding to the graphical representation of solar output P by the solar inverter S over a plurality of respective sub-time-periods of the full window time period.

If solar output P is constant throughout a given window, then the volatility difference will equal 1. The volatility difference becomes smaller as solar output P fluctuates more within a given window. The volatility difference will always be between 1 and 0. Linear distance is calculated between any two points as follows in Equation 2. Given two points: $(t_1, kW_1), (t_2, kW_2)$:

$$\text{Linear distance} = \sqrt{((t_2-t_1)^2 + (kW_2-kW_1)^2)} \qquad \text{(Equation 2)}$$

The below Table 1 indicates user-supplied/configurable setpoints that can control how the algorithm/operations described herein function(s). These setpoints make the algorithm/operations customizable for many different capacities of solar installations, and set the sensitivity and performance characteristics of the algorithm/operations.

TABLE 1

| Setpoint | Units | Purpose | Notes |
|---|---|---|---|
| Solar nameplate capacity | kW | Indicates the maximum active power output from the given solar installation. | Remains constant for a given installation. |
| Volatility difference limit | 0-1, no units | Provides the threshold for when curtailment commands are issued. | In general, the algorithm creates a less volatile solar output profile when the volatility difference limit is higher (i.e., closer to 1). |
| Ramp up limit | kW/minute | Limits the amount the curtailment command can be raised per period. | Prevents/inhibits the algorithm from causing rapid fluctuations when curtailment commands are raised. |
| Ramp down limit | kW/minute | Limits the amount the curtailment command can be lowered per period. | Prevents/inhibits the algorithm from causing rapid fluctuations when curtailment commands are lowered. |
| Detection window | Minutes | Specifies the trailing time window that is used to calculate the volatility difference. | |
| Recovery window | Minutes | Specifies the trailing time window that is used to calculate the volatility difference. | A shorter recovery window enables the algorithm to relax the curtailment sooner to increase/maximize the energy produced from the solar. |

Figure 5:
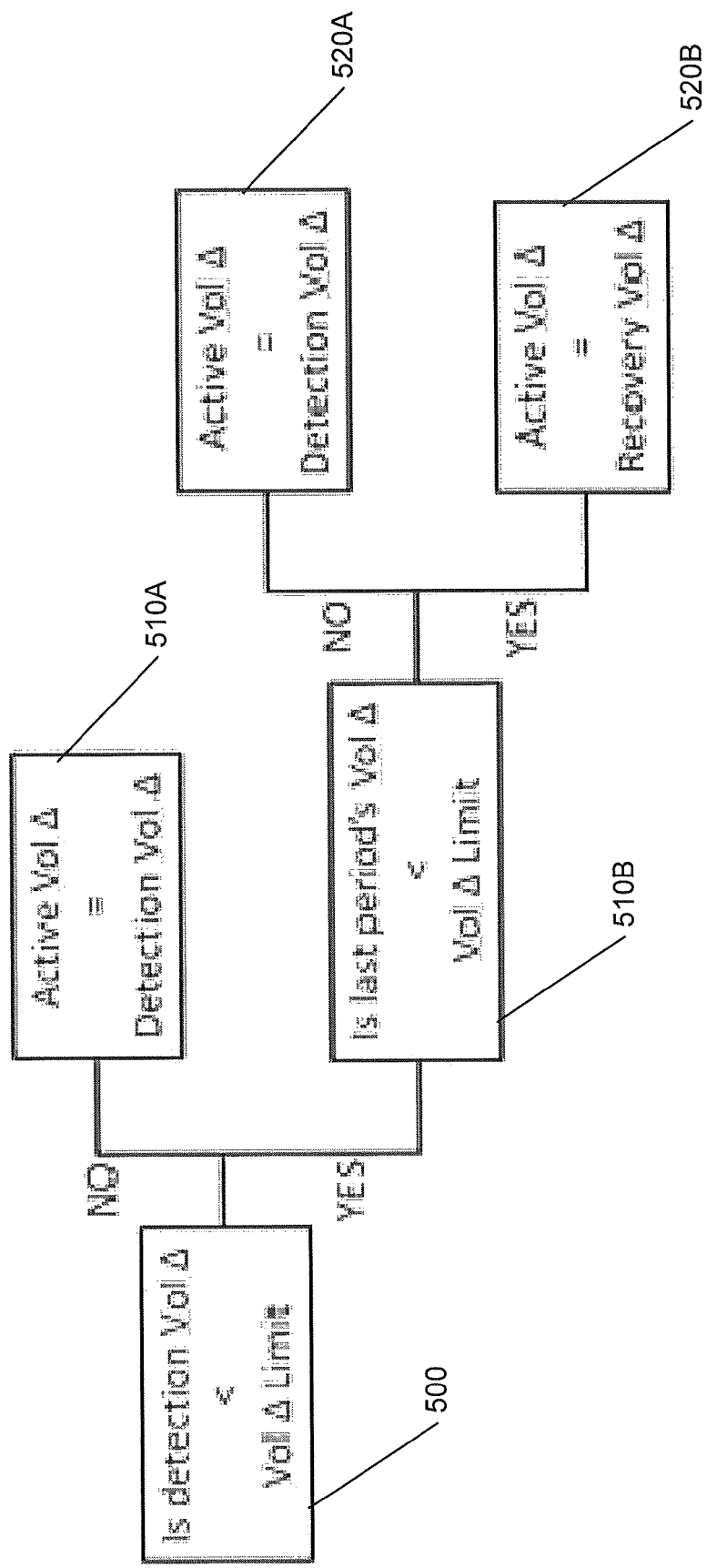
FIGS. 5 and 6 are flowcharts illustrating operations that use volatility difference values, according to various embodiments.
Figure 6:
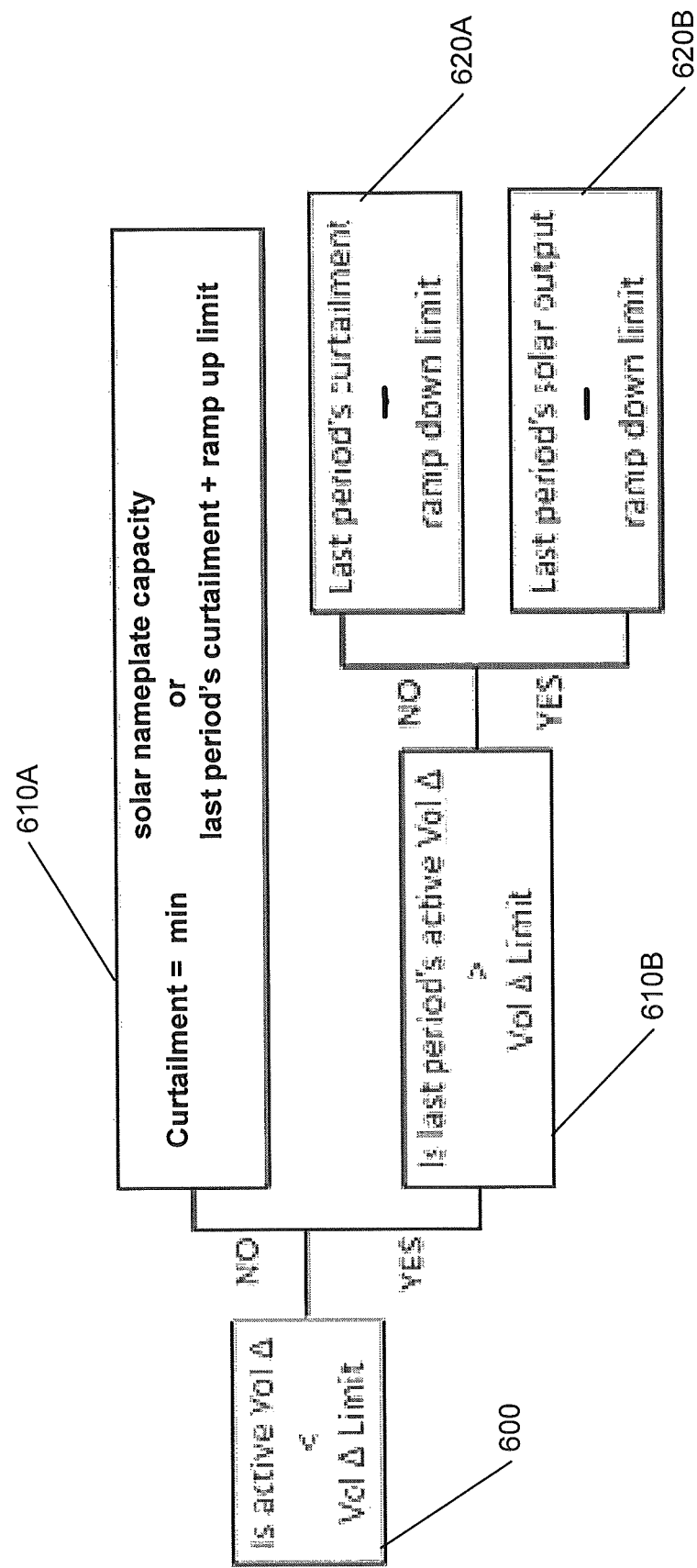

Referring now to FIGS. 5 and 6, flowcharts are provided illustrating operations that use volatility difference values, according to various embodiments. Referring to FIG. 5, in some embodiments, the active volatility difference may be continuously compared (in Block 500) with a user-provided setpoint volatility difference limit (e.g., the limit in Block 210C' of FIG. 2C). The limit may vary based on grid conditions (e.g., based on a desired sensitivity level). For example, the limit may be set such that if volatility is less than 95% of ideal, then the solar inverter S will curtail its power output P.

Operations herein (e.g., operations executed using an algorithm) subsequently automatically select between two possible volatility differences. Initially, and whenever there is not an active curtailment, (1) a detection volatility difference is selected as the active volatility difference. If the last period's volatility difference was less than the volatility limit (and a curtailment command CC was issued), then the active volatility difference becomes (2) a recovery volatility difference.

The detection volatility difference and the recovery volatility difference are calculated the same way. The difference is in the window length. A longer detection window enables the algorithm/operations herein to be more sensitive to longer periods of volatility to issue an initial curtailment command CC. Once a curtailment command is issued, a shorter recovery window allows the curtailment to be raised sooner in an effort to increase/maximize solar energy output P. FIG. 5 illustrates determining the active volatility difference using the operations in Blocks 500, 510 (510A or 510B), and 520 (520A or 520B). In some embodiments, Block 210C' of FIG. 2C may include the operations of FIG. 5.

Referring to FIG. 6, the curtailment command CC indicates/controls the maximum active power output that the solar inverter S is permitted to discharge at its AC output. Output power P may not exceed this value, although it may be below this value. The algorithm/operations herein can issue the curtailment command CC when past fluctuations in solar output P provide a variable volatility difference value that is below a user-supplied setpoint (e.g., the threshold of Block 210C of FIG. 2B). This results in curtailment that makes subsequent fluctuations in solar output P less likely to be seen in the AC output of the solar inverter S (and thus by the grid 100) because the fluctuations would likely occur above the curtailed power level.

Initially, the curtailment command CC is set as the maximum rated output of the solar inverter S. During the period when the active volatility difference is first lower than the volatility limit (the active volatility difference will be the detection volatility difference at this time), a curtailment command CC is issued that equals the last period's solar output level less/minus the ramp down limit. (See FIG. 6, Blocks 600, 610B, and 620A.) The curtailment command CC then drops each period until the active volatility difference exceeds the volatility limit (now the active volatility difference will be the recovery volatility difference). For each subsequent period where the active volatility difference is greater than the volatility limit, the curtailment command CC will be raised by the ramp up limit. (See FIG. 6, Blocks 600, and 610A.) In some embodiments, Blocks 210, 220, and/or 230 of FIG. 2C may include the operations of FIG. 6.

Figure 7:
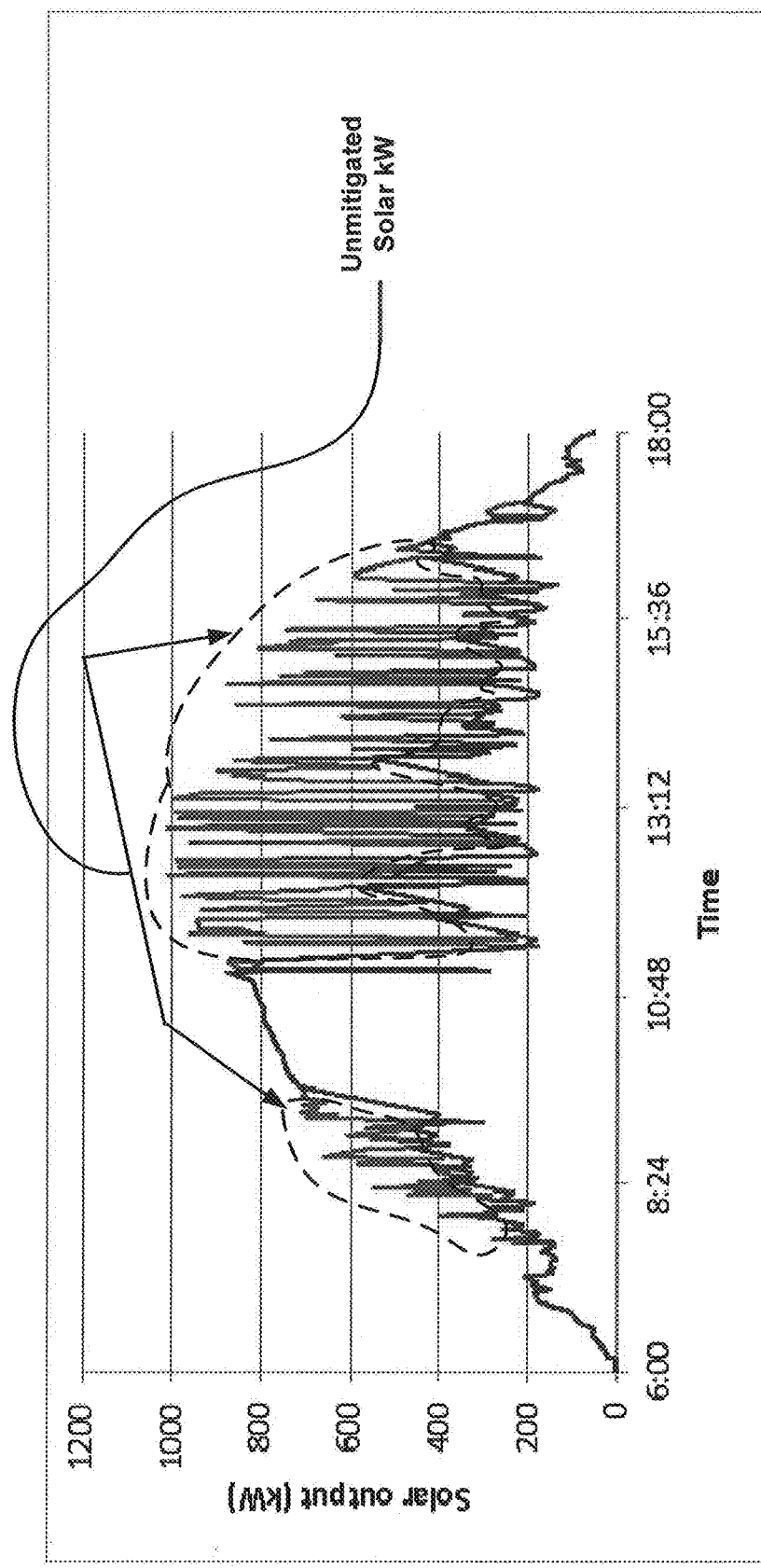
FIGS. 7 and 8 are graphs illustrating curtailment of solar inverter power output, according to various embodiments.
Figure 8:
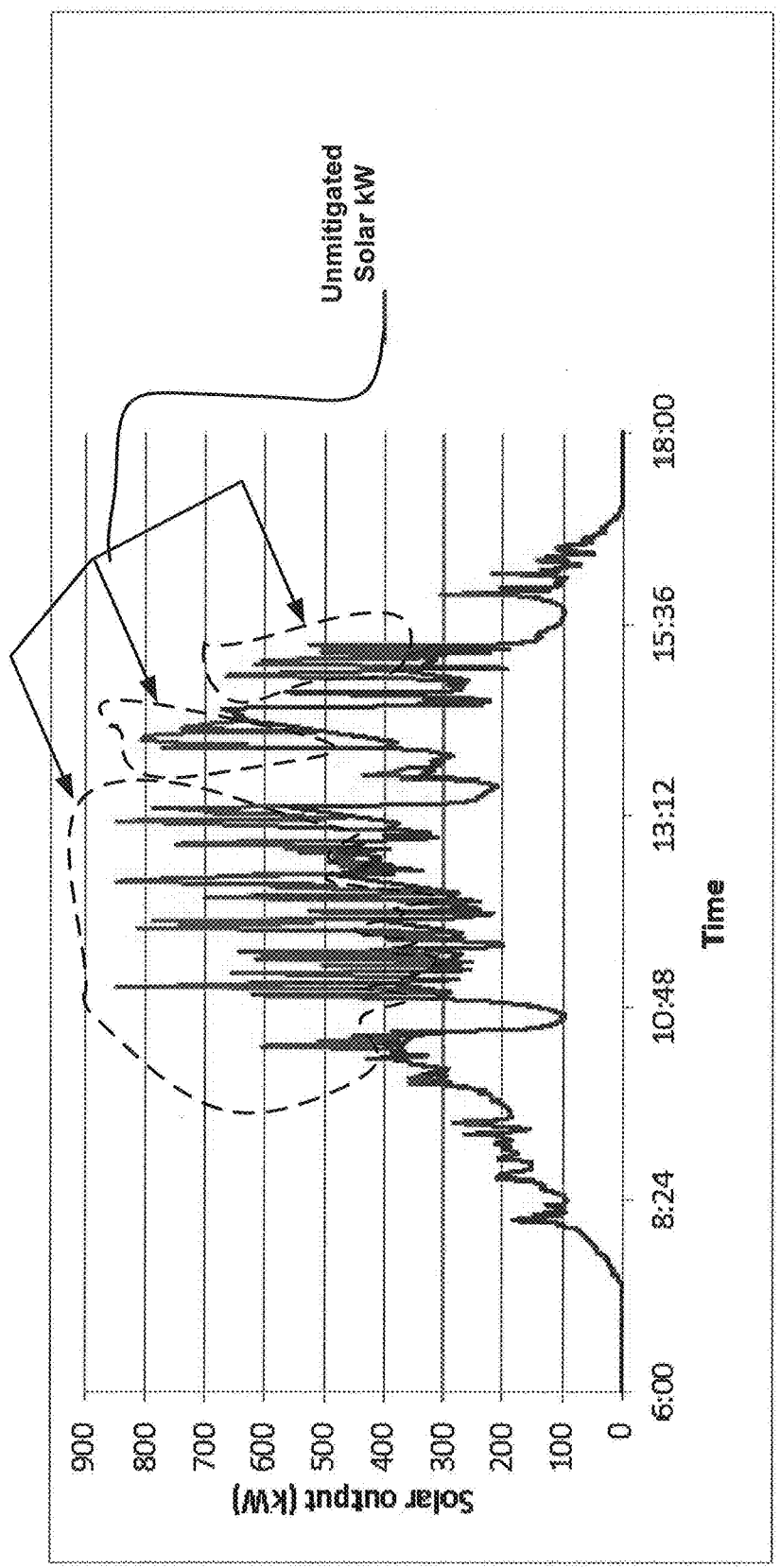

Referring now to FIGS. 7 and 8, graphs are provided illustrating curtailment of solar inverter power output P, according to various embodiments. FIG. 7 illustrates one example of results that have been modeled using actual solar output data. The solar output data is from Apr. 8, 2012 at a 1 megawatt (MW) solar plant. The more-heavily-spiked, "unmitigated solar kW" portions of FIG. 7 represent the actual solar output P without the curtailment algorithm/operations described herein in place, whereas the smoother, remaining portions of FIG. 7 show the modeled solar output P with the curtailment algorithm/operations described herein in place. Algorithm/operations setpoints are provided below in Table 2. These configurable setpoints can give a utility operator the ability to adjust the sensitivity of the algorithm/operations depending upon grid conditions. Using the solar output data (e.g., using a trailing series of the solar output data) and incorporating the user-specified setpoints, the algorithm/operations issue(s) a curtailment command CC to the solar inverter S to limit its maximum active power output.

TABLE 2

| Solar nameplate capacity | 1000 | kW |
|---|---|---|
| Volatility Δ limit | 0.9 | (0-1) |
| Ramp Up Limit | 15 | kW/min |
| Ramp Down Limit | 5 | kW/min |
| Detection window | 20 | min |
| Recovery window | 5 | min |

FIG. 8 illustrates another example of results that have been modeled using actual solar output data. The solar output data is from Nov. 20, 2012 from a 1 MW solar array. Algorithm setpoints are provided below in Table 3.

TABLE 3

| Solar nameplate capacity | 1000 | kW |
|---|---|---|
| Volatility Δ limit | 0.97 | (0-1) |
| Ramp Up Limit | 15 | kW/min |
| Ramp Down Limit | 5 | kW/min |
| Detection window | 20 | min |
| Recovery window | 5 | min |

According to various embodiments described herein, volatility curtailment algorithm/operations is/are designed to detect solar intermittency and to preemptively limit the solar output P of a solar inverter S to reduce the likelihood of subsequent output fluctuations. The algorithm/operations monitor(s) the power output P of the solar inverter S and order(s) the solar inverter S to curtail its output S when a specified level of power fluctuations are experienced. Various parameters within the algorithm/operations are configurable to adjust the sensitivity of the algorithm/operations and to manage the balance between intermittency reduction and energy loss through curtailment. Solar installations (e.g., the solar installation 120) equipped with the algorithm/operations will have a less negative impact on utility circuits to which they are connected.

In particular, the volatility curtailment algorithm/operations described herein can measure and evaluate past intermittency, limit subsequent intermittency via curtailment, and slowly release the curtailment command CC as intermittency is reduced. Various embodiments described herein may provide a control algorithm that acts as a supervisor to a solar inverter S and curtails the solar output P. In some embodiments, the solar control algorithm can be hosted off-board of the solar inverter S. For example, it can be hosted on a utility platform 300 and send supervisory signals to a solar inverter S. Alternatively, the solar control algorithm can be hosted anywhere else that supports very low latency of communications between measuring solar inverter S power output P and using the algorithm to provide the curtailment command CC. As an example, the communication node C illustrated in FIG. 1A (or some other cloud location/device) may host the algorithm in some embodiments supporting such very low latency.

Moreover, the present inventive entity appreciates that the volatility curtailment algorithm/operations described herein provide(s) for looking at how to influence solar output P for a reason (e.g., balance, reduced volatility) other than merely achieving more/maximum power output. In particular, by exchanging some energy output for less output volatility, the algorithm/operations can make solar generation less likely to negatively impact (e.g., by creating rapid output fluctuations) a utility circuit. The algorithm/operations may thus enable more solar power to be connected to utility circuits where solar capacity was previously limited.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method for reducing solar inverter output volatility, the method comprising:
    determining whether an output fluctuation by a solar inverter is likely, using output data of the solar inverter; and
    curtailing an output of the solar inverter in response to determining that the output fluctuation by the solar inverter is likely,
    wherein determining whether the output fluctuation is likely comprises:
        determining a volatility difference for the solar inverter, the volatility difference comprising a ratio between:
            an end-to-end straight linear distance corresponding to a graphical representation of power output by the solar inverter over a time period; and
            a summation of a plurality of linear distances corresponding to the graphical representation of power output by the solar inverter over a plurality of respective sub-time-periods of the time period.

2. The method of claim 1, wherein determining whether the output fluctuation is likely comprises:
    determining a likelihood of the output fluctuation by the solar inverter, using the output data of the solar inverter; and
    comparing the likelihood of the output fluctuation by the solar inverter with a threshold.

3. The method of claim 1,
    wherein the output data of the solar inverter comprises real-time and/or past output data of the solar inverter, and
    wherein determining whether the output fluctuation by the solar inverter is likely comprises:
        determining whether the output fluctuation by the solar inverter is likely, using the real-time and/or past output data of the solar inverter.

4. The method of claim 3,
    wherein the output fluctuation comprises a future output fluctuation, and
    wherein determining whether the output fluctuation by the solar inverter is likely comprises:
        determining whether the future output fluctuation by the solar inverter is likely, using the real-time and/or past output data of the solar inverter.

5. The method of claim 3, wherein determining whether the output fluctuation by the solar inverter is likely comprises:
    determining whether the output fluctuation by the solar inverter is likely, using the real-time and/or past output data of the solar inverter, independently of any measurement or detection by a cloud-cover sensor or another inverter.

6. The method of claim 3, further comprising measuring the real-time and/or past output data of the solar inverter by measuring power that is output by the solar inverter, wherein determining whether the output fluctuation by the solar inverter is likely comprises:

determining whether the output fluctuation by the solar inverter is likely, using only the real-time and/or past output data of the solar inverter.

7. The method of claim 6,
wherein the real-time and/or past output data of the solar inverter comprises at least one discrete value of real-time and/or past output of the solar inverter, and
wherein determining whether the output fluctuation by the solar inverter is likely comprises:
determining whether the output fluctuation by the solar inverter is likely, using only the at least one discrete value of real-time and/or past output of the solar inverter.

8. The method of claim 1, wherein operations of determining whether the output fluctuation by the solar inverter is likely and curtailing the output of the solar inverter are self-contained within the solar inverter.

9. The method of claim 1,
wherein determining whether an output fluctuation by the solar inverter is likely comprises:
generating, at a node of a solar installation that includes the solar inverter, the output data of the solar inverter by measuring power that is output by the solar inverter; and
determining, at the node, whether the output fluctuation by the solar inverter is likely, using the output data of the solar inverter, and wherein curtailing the output of the solar inverter comprises:
transmitting a curtailment command to limit the output of the solar inverter, from the node to the solar inverter, in response to determining that the output fluctuation by the solar inverter is likely.

10. The method of claim 1, further comprising gradually reducing an amount of curtailment of the output of the solar inverter.

11. The method of claim 1, wherein determining whether the output fluctuation is likely comprises:
determining whether the output fluctuation by the solar inverter is likely, independently of Maximum Power Point Tracking for the solar inverter.

12. A node of a solar installation, the node comprising:
a processor configured to:
generate output data by measuring power that is output by a solar inverter of the solar installation;
determine whether an output fluctuation by the solar inverter is likely, using the output data from the solar inverter; and
transmit, to the solar inverter, a curtailment command to limit the output of the solar inverter, in response to determining that the output fluctuation by the solar inverter is likely,
wherein the processor is configured to determine whether the output fluctuation is likely by:
determining a volatility difference for the solar inverter, the volatility difference comprising a ratio between:
an end-to-end straight linear distance corresponding to a graphical representation of solar output by the solar inverter over a time period; and
a summation of a plurality of linear distances corresponding to the graphical representation of solar output by the solar inverter over a plurality of respective sub-time-periods of the time period.

13. The node of claim 12, wherein the processor is configured to determine whether the output fluctuation by the solar inverter is likely by:
determining a likelihood of the output fluctuation by the solar inverter, using the output data from the solar inverter; and
comparing the likelihood of the output fluctuation by the solar inverter with a threshold.

14. The node of claim 12,
wherein the output data of the solar inverter comprises real-time and/or past output data of the solar inverter, and
wherein the processor is configured to determine whether the output fluctuation by the solar inverter is likely, using the real-time and/or past output data of the solar inverter.

15. The node of claim 14,
wherein the output fluctuation comprises a future output fluctuation, and
wherein the processor is configured to determine whether the output fluctuation by the solar inverter is likely by:
determining whether the future output fluctuation by the solar inverter is likely, using the real-time and/or past output data of the solar inverter.

16. A solar inverter, comprising:
circuitry configured to provide a power output; and
a processor configured to:
receive, from a node of a solar installation that includes the solar inverter, a curtailment command to preemptively limit the power output of the solar inverter in advance of a likely fluctuation of the power output; and
preemptively limit the power output of the solar inverter in advance of the likely fluctuation of the power output, in response to the curtailment command from the node of the solar installation,
wherein the curtailment command is based on a volatility difference for the solar inverter, the volatility difference comprising a ratio between:
an end-to-end straight linear distance corresponding to a graphical representation of solar output by the solar inverter over a time period; and
a summation of a plurality of linear distances corresponding to the graphical representation of solar output by the solar inverter over a plurality of respective sub-time-periods of the time period.

17. The solar inverter of claim 16, wherein the processor is configured to receive the curtailment command directly from the node via a message bus that is within the solar installation.

18. A solar inverter, comprising:
circuitry configured to provide a power output; and
a processor configured to:
determine whether a fluctuation of the power output is likely, using real-time and/or past output data for the solar inverter; and
preemptively limit the power output of the solar inverter in advance of the fluctuation of the power output, in response to determining that the fluctuation of the power output is likely,
wherein the processor is configured to determine whether the fluctuation is likely by:
determining a volatility difference for the solar inverter, the volatility difference comprising a ratio between:
an end-to-end straight linear distance corresponding to a graphical representation of solar output by the solar inverter over a time period; and
a summation of a plurality of linear distances corresponding to the graphical representation of solar output by the solar inverter over a plurality of respective sub-time-periods of the time period.

* * * * *

UNITED STATES PATENT AND TRADEMARK OFFICE
CERTIFICATE OF CORRECTION

PATENT NO. : 9,507,364 B2
APPLICATION NO. : 14/202854
DATED : November 29, 2016
INVENTOR(S) : Sowder Page 1 of 1

It is certified that error appears in the above-identified patent and that said Letters Patent is hereby corrected as shown below:

In the Specification

Column 10, Line 27: Please correct "(volatility A)"
to read -- (volatility $\Delta$) --

Column 10, Line 32: Please correct "Equation 1':"
to read -- Equation 1: --

Column 10, Line 37: Please correct "ç=0" to read -- $t$ =0 --

Column 10, Line 41: Please correct "Equation 1:"
to read -- Equation 1': --

Signed and Sealed this
Sixth Day of June, 2017

Michelle K. Lee
*Director of the United States Patent and Trademark Office*